(12) United States Patent
Alofs et al.

(10) Patent No.: US 6,272,406 B2
(45) Date of Patent: *Aug. 7, 2001

(54) GUIDANCE SYSTEM FOR AN AUTOMATED GUIDED-VEHICLE

(75) Inventors: Cornell W. Alofs; Ronald R. Drenth, both of Petoskey, MI (US)

(73) Assignee: Jervis B. Webb Company, Farmington Hills, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/038,693

(22) Filed: Mar. 9, 1998

(51) Int. Cl.[7] ............................. B62D 65/00; B62D 1/24
(52) U.S. Cl. .............................. 701/24; 701/18; 701/25; 340/933; 340/961; 340/988; 340/991; 364/461; 342/457
(58) Field of Search ............................... 701/24, 19, 25, 701/18; 246/182, 122 R; 346/113; 340/988, 961, 933, 991; 364/424.024, 461, 436; 342/457

(56) References Cited

U.S. PATENT DOCUMENTS

| 3,067,697 | 12/1962 | Doolittle | 104/246 |
|---|---|---|---|
| 4,015,539 | * 4/1977 | Hamada | 104/130 |
| 4,041,876 | 8/1977 | Michel | 104/130 |
| 4,183,304 | * 1/1980 | Forster | 104/247 |
| 4,213,396 | 7/1980 | Mehren et al. | 104/130 |
| 4,221,171 | 9/1980 | Flaig et al. | 104/130 |
| 4,301,739 | * 11/1981 | Mehren et al. | 104/247 |
| 4,866,617 | 9/1989 | Matsuda et al. | 364/424.02 |
| 4,901,810 | 2/1990 | Christ et al. | 180/131 |
| 5,365,856 | 11/1994 | Richert et al. | 104/243 |
| 5,434,781 | 7/1995 | Alofs et al. | 364/424.02 |
| 5,740,046 | * 4/1998 | Elestedt | 364/436 |
| 5,740,547 | * 4/1998 | Kull et al. | 701/19 |
| 5,757,291 | * 5/1998 | Kull | 340/988 |
| 5,803,411 | * 9/1998 | Ackermann et al. | 246/169 R |
| 5,813,635 | * 9/1998 | Fernandez | 246/168 |
| 5,925,080 | * 7/1999 | Shimbara et al. | 701/23 |

FOREIGN PATENT DOCUMENTS

| 25 30 938 | 1/1977 | (DE) . |
| 0 285 232 A1 | 1/1988 | (EP) . |
| 0 449 754 A2 | 3/1991 | (EP) . |
| 0 285 232 A1 | * 10/1988 | (GB) . |
| WO 92/09941 | 6/1992 | (WO) . |

OTHER PUBLICATIONS

European Search Report, Application No. EP 99 10 3514.

* cited by examiner

*Primary Examiner*—William A. Cuchlinski, Jr.
*Assistant Examiner*—Tuan To
(74) *Attorney, Agent, or Firm*—Dickinson Wright PLLC

(57) ABSTRACT

A guidance system for guiding an automated guided vehicle along a pathway is disclosed which includes rails for holding the AGV to the generally straight portions of the pathway and a non-rail guidance system for directing the AGV from the end of a first rail segment to the beginning of another. The rails provide the necessary level of control to allow an unmanned vehicle to move at high speeds while the non-rail guidance system eliminates the need for the rail switches that would otherwise be needed to shift a rail guided vehicle from one rail portion to another.

29 Claims, 5 Drawing Sheets

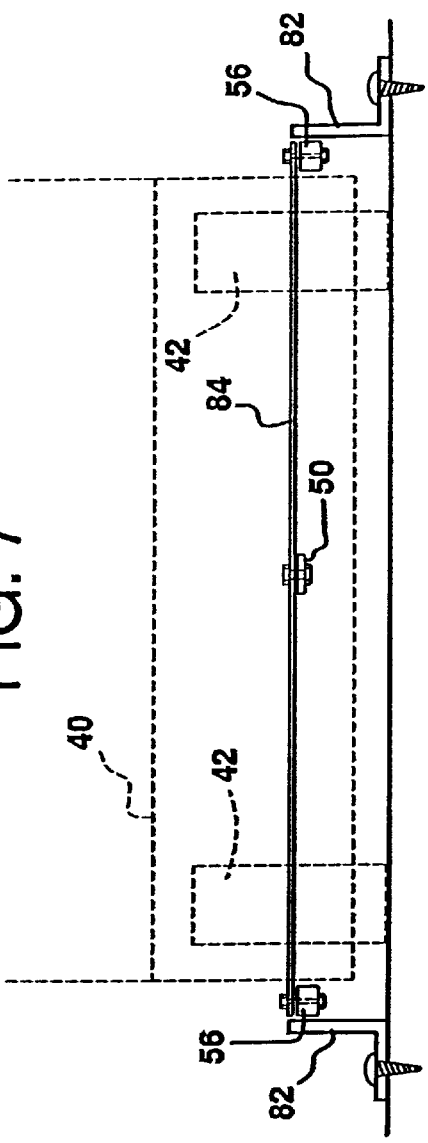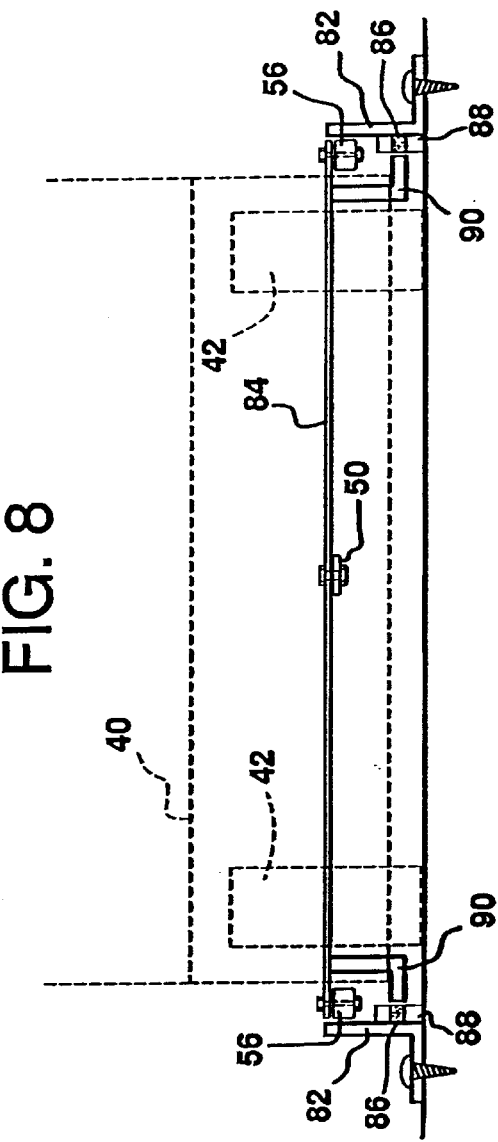

GUIDANCE SYSTEM FOR AN AUTOMATED GUIDED-VEHICLE

The present invention is directed toward a guidance system for guiding an automated guided vehicle (AGV) along a pathway, and more specifically, toward a guidance system for an AGV that uses rails to guide the AGV through first portions of a pathway and a non-rail control system to guide the AGV through second portions of the pathway.

BACKGROUND OF THE INVENTION

There are two general types of AGV guidance systems, rail systems and non-rail systems. In the first type of system, a pathway is formed out of rails. These rails may support an AGV or merely guide the AGV's wheels as they roll along the ground. In a non-rail system, the AGV may include detectors for detecting and following a wire in the ground that marks out a pathway, or a controller for following a set of commands to navigate between various types of reference markers. Each of these systems has certain advantages and drawbacks, and the choice of which system to use is normally based on many factors such as the needs of the particular user and the environment in which the system will operate.

Rail guidance allows for precise control over the position of an AGV. Where only a limited number of pathways are needed, and where these pathways do not need to be changed frequently, rail guidance offers a relatively simple method of keeping an AGV on a selected path. One of the biggest drawbacks to rail guidance, however, is that switches are needed to direct AGV's from one pathway to another. These switches are relatively costly and include moving parts that can wear out. In addition, each switch must be connected to a power source, a sensor for determining the position of the switch, and a controller for moving the switch from one position to another at appropriate times. The switches are often connected to a controller and to one another by a series of wires that run along the pathways, and these wires are expensive to install and maintain. Furthermore, the wires must be reconfigured each time the system is modified. Another disadvantage to such systems is that the rails themselves are generally raised off the ground and can interfere with the free movement of people and other vehicles.

Non-rail guidance systems offer increased design flexibility since pathways can be changed by reprogramming the AGV's or their controllers and without removing and re-laying rails. Moreover, because each vehicle receives or is programmed with instructions concerning the pathway to follow, switches are not needed to shift a vehicle from one path to another. However, because AGV's in such a system can stray from their pathways, extra care is required to make sure that each AGV is in its intended location and often this entails virtually constant communication with each AGV in the system. The quality of the communication link and the speed at which information about the AGV's and their positions can be processed also limits the maximum rate of travel of these systems. Moreover, collision avoidance becomes more complicated when AGV's travel along pathways that are not defined by rails. The need to constantly monitor and control a large number of AGV's, and to keep them on course and to avoid collisions, requires a significant amount of processing power which can make non-rail guidance systems more complex and expensive to operate than rail systems.

For high speed transport, that is for speeds in the range of 2200 feet per minute, rail guidance has traditionally been the only practical method for guiding an AGV. This is in part due to a perception that it is unsafe to operate vehicles at high speeds without physical path constraints and partly due to control problems. For example, the servo-control mechanisms used to steer AGV's often cannot respond quickly enough to the changing location of a guide wire in order to control a fast-moving vehicle. In addition, the signal to noise ratio of the position sensors may be too low to allow them to accurately sense the presence of a wire in the ground or to communicate reliably with a central controller when moving rapidly. Therefore, in applications where high speeds are needed, it has heretofore been necessary to use rail based control with all of its attendant drawbacks.

SUMMARY OF THE INVENTION

The present invention addresses the above and other problems by providing an AGV control system that uses rails for controlling an AGV through high speed portions of a pathway and non-rail controls for guiding the AGV through turns and other low speed portions of the pathway. Beneficially, this system eliminates the need to use track or rail switches. The result is a control system for AGV's that allows vehicles to operate at the same high speeds as rail-based systems with a high degree of safety. In addition, this system does not require the monitoring of switches or constant communication with each vehicle because the vehicles are physically constrained to a guidepath over the majority of the pathway that they traverse.

In the preferred embodiment, a pathway is designed which connects various loading and unloading sites and which includes straight sections, branches, and curves. Guiding rails are laid out along the straight-aways and gaps are left at the curves and near branches. A non-rail guidance system, such as an in-the-ground wire, is used to continue the pathways between the ends of the rails. The AGV's are provided with steering arms for engaging and following the rail or track sections and sensors for following the in-the-ground wires. Machine-readable tags are positioned at various points along the rail sections to provide information concerning the identity and length of the rail, and the radii of the turns which might be made at the end of the section. The AGV's also include sensors for reading the in-the-ground wires.

In operation, a central controller provides an AGV with instructions for traveling from an origin to a destination which instructions tell the AGV which rails to follow and how to turn at the end of each segment. The AGV is inserted into the system at the entrance end of a straight rail section and moved along the rail until it passes an initial reference marker that tells the vehicle where it is. If this location is consistent with its instructions for reaching a destination, it will accelerate to a high speed and travel along the rail looking for additional reference markers. One of these reference markers will tell the AGV the distance to the end of the rail. If the AGV's instructions are to continue in a straight line to the next rail section, the AGV will lock its steering wheels, maintain its speed, and travel past the end of the first rail and onto the entrance to a second rail collinear with the first rail. It will then continue along that rail section until another reference marker is encountered. Alternately, if the AGV's instructions provide that the vehicle is to make a 90 degree turn to the right at the end of the first rail, the AGV will begin to decelerate when the reference marker indicates that the end of the rail is approaching. The AGV will decelerate to a safe turning speed by the time it reaches the end of the rail and then use its onboard sensors to follow the in-the-ground wire that leads from the end of one rail segment to the beginning of the next. The AGV travels onto the second rail and resumes its high speed. This process continues until the vehicle reaches its final destination.

It is therefore the principal object of the present invention to provide an improved guidance system for automated guided vehicles.

It is another object of the present invention to provide a switchless rail-based AGV guidance system.

It is a further object of the present invention to provide an AGV guidance system that uses a first guidance mechanism for guiding the AGV along high speed portions of the pathway and a second guidance mechanism for guiding the AGV along low speed portions of the pathway.

It is still another object of the present invention to provide an AGV guidance system to which additional branches may be easily added.

It is still a further object of the present invention to a guidance system for high speed AGV's which integrates guide rails into a reference marker based system.

It is yet another object of the present invention to provide an AGV guidance system that uses physically constraining guide members to define the high speed portion of an AGV pathway and reference markers that can be sensed by the AGV to define turns and other low speed portions of the pathway.

BRIEF DESCRIPTION OF THE DRAWINGS

These and other objects and advantages of the subject invention will be better appreciated after a reading of the following detailed description of several preferred embodiments of the invention together with the following drawings of which:

FIG. 7 is a sectional elevational view of a third embodiment of the present invention in which portions of a pathway are defined by a pair of spaced apart guiding rails; and, FIG. 8 is a sectional elevational view of a fourth embodiment of the present invention in which portions of a pathway are defined by a pair of spaced-apart guiding rails equipped with electrical bus bars for providing power to the AGV.

DETAILED DESCRIPTION OF THE PREFERRED EMBODIMENTS

Figure 1:
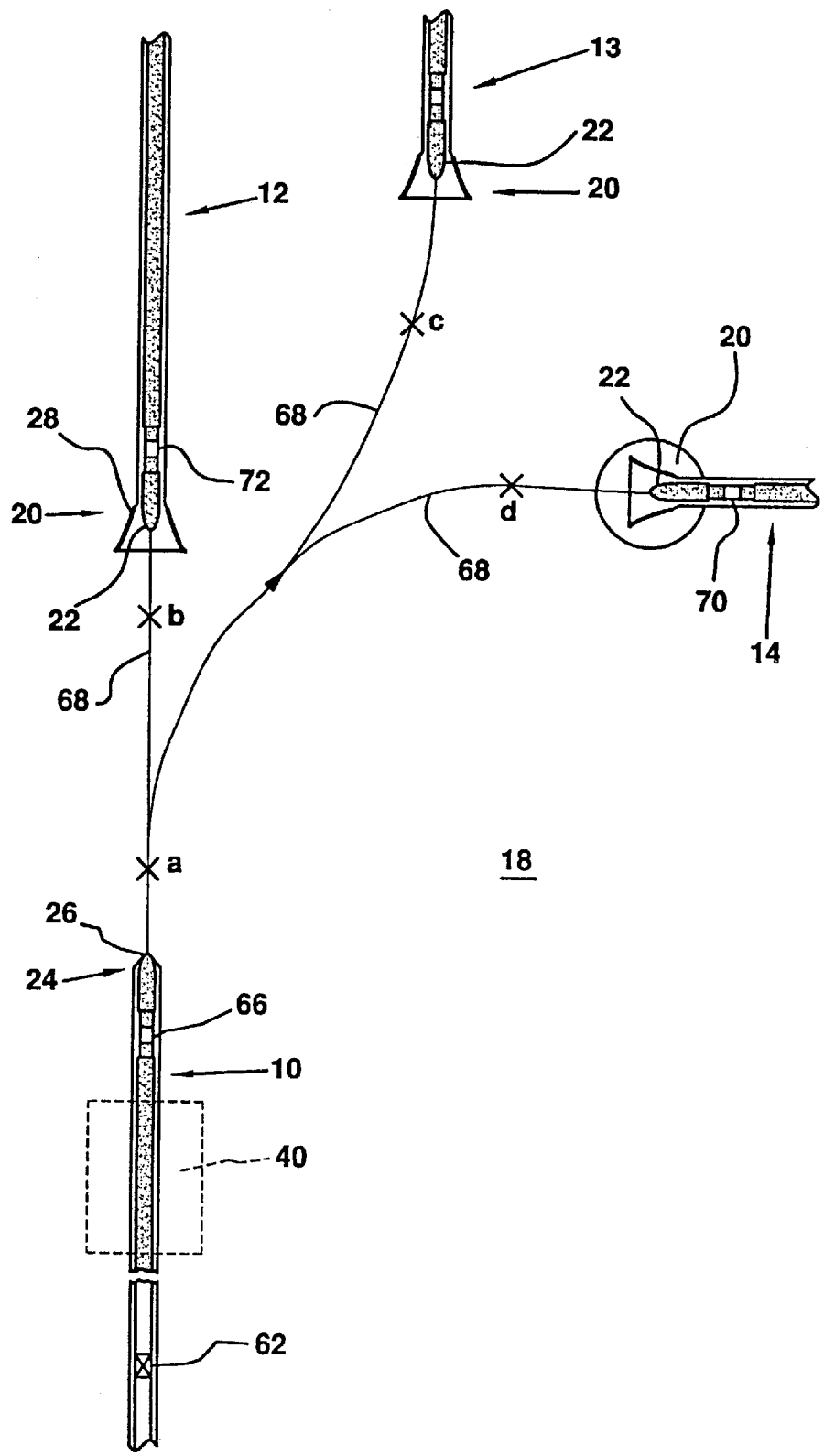
FIG. 1 is a plan view of various pathways along which an AGV may be guided by a guidance system according to the present invention.
Figure 2:
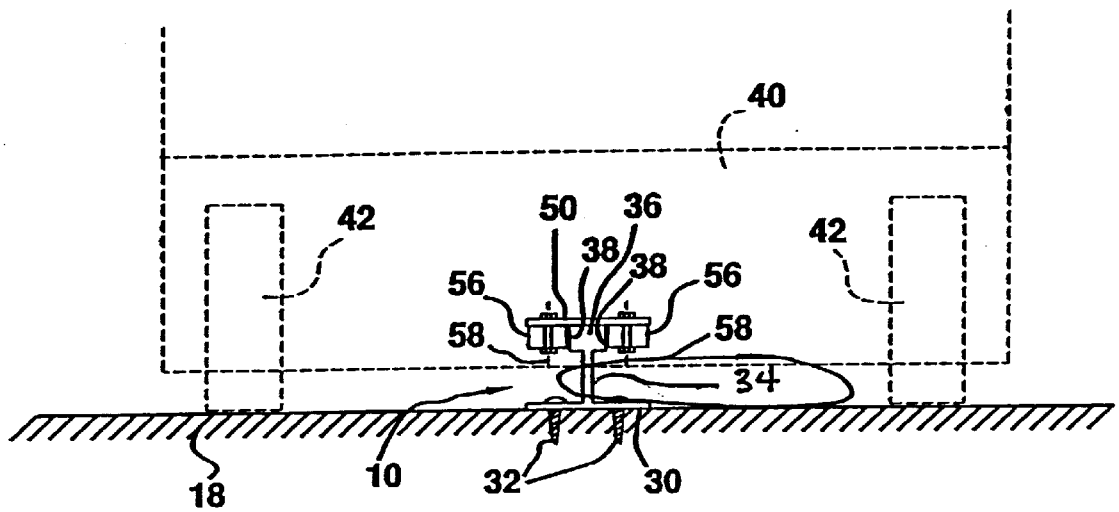
FIG. 2 is a sectional elevational view of an AGV following a rail in one of the pathways shown in FIG. 1.
Figure 4:
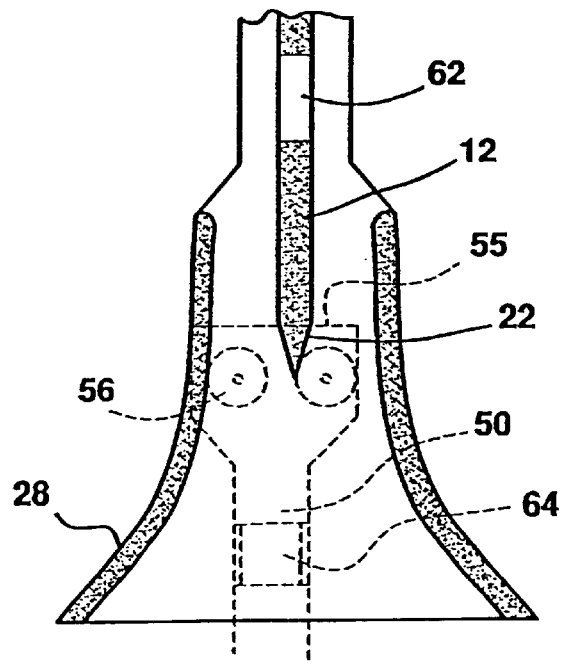
FIG. 4 is a plan view, partly in section, of the steering system of the AGV of FIG. 2.

Referring now to the drawings, wherein the showings are for purposes of illustrating several preferred embodiments of the subject invention only and not for purposes of limiting same, FIG. 1 shows a number of rail segments 10, 12, 14, and 16 for guiding an AGV along a pathway on a paved surface 18. The shape of the pathway will vary depending on the environment in which this system is used; however, each straight portion of the pathway will be defined by a rail segment. Each segment includes an entrance end 20 having a tapered portion 22 and an exit end 24 having a tapered portion 26. Furthermore, each entrance end includes a flared guide 28 the purpose of which will be described hereinafter. As can be seen in FIG. 2, each rail comprises a base 30 connected to ground 18 by bolts 32 or other suitable means, a vertical web 34 extending perpendicularly from base 30, and a top strip 36 supported on top of web 34 and including spaced apart side walls 38 generally perpendicular to surface 18. The rails are preferably formed from steel, although other materials can be used if they possess sufficient strength to maintain their shape and under the operating conditions to be described herein.

Figure 3:
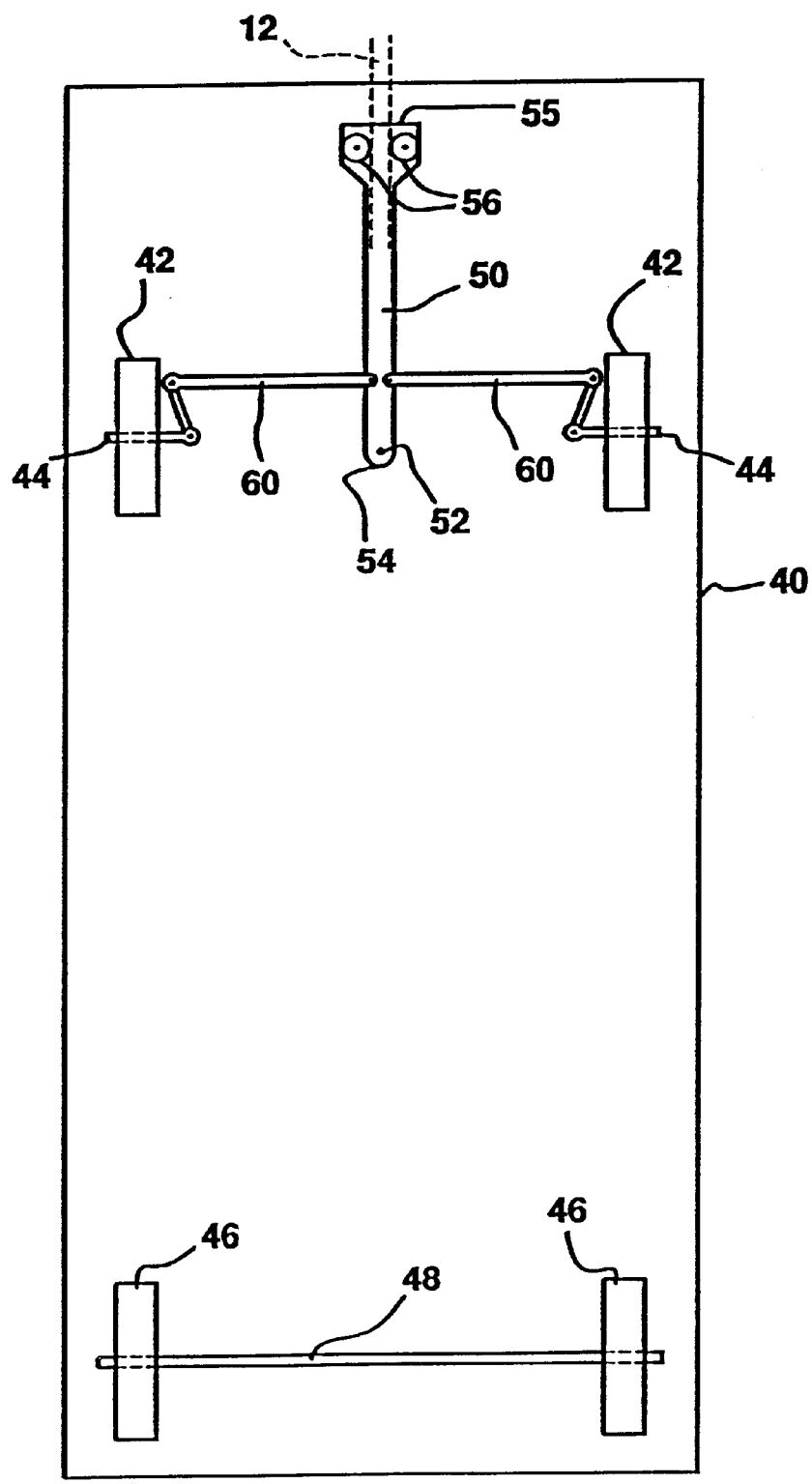
FIG. 3 is a plan view of the entrance end of the rail shown in FIG. 2 and the leading portion of the AGV steering arm about to engage the rail.

FIG. 3 shows an AGV 40 having two front wheels 42 supported on axles 44 and two rear wheels 46 supported on an axle 48. The AGV is powered by an onboard battery (not shown). A steering arm 50 extends forwardly of front axles 44 and is pivotally connected to the frame of the AGV by a pin 52 at its fixed end 54. The free end 55 of steering arm 50 includes two spaced-apart guide rollers 56 depending therefrom which rollers have parallel axes 58. Guide rollers 56 are spaced apart by a distance equal to the width of top strip 36 so that the rollers will engage and roll along side walls 38 of strip 36 as steering arm 50 traverses the guide rail. A pair of tie rods 60 are connected between steering arm 50 and front axles 44 so that the movement of arm 50 about pin 52 as the steering arm follows the guide rail causes wheels 42 to turn. In this manner, wheels 42 are kept generally parallel to the rail to cause the AGV to follow the rail. Alternately, an AGV can be provided with steerable rear wheels which are coupled to the front wheels to move therewith or which are connected to a second steering arm which causes the rear wheels to follow the rail in the same manner as the front wheels.

There are many types of AGV's and AGV control systems. Some AGV's follow an in-the-ground wire using a sensor to sense the magnetic field generated by a current in the wire. The steering system of these vehicles is connected to the sensor, and the AGV steers itself to keep the sensor centered over the wire. When the AGV is given a command to start, it travels along the wire until it reaches a branch or receives a command to stop. At a branch, the AGV follows whatever instructions it is given concerning the appropriate branch to follow. Such a system is shown in U.S. Pat. No. 5,434,781, for example, and the disclosure of this patent is incorporated herein by reference. Other AGV's follow commands sent from central controllers which tell the AGV where it should go and the speed it should travel. Reference markers are sensed by the AGV as it passes near or between them, and these markers are used to determine the position and/or bearing of the AGV to help it follow the proper course. An example of such a control system is disclosed in U.S. Pat. No. 4,866,617 which is also incorporated herein by reference. In the present invention, the exact type of non-rail guidance system is not important. Any such system which is capable of guiding an AGV may be used, as long as it can cause the AGV to start, stop, and travel over particular path. In the preferred embodiment AGV 40 follows a wire buried beneath ground 18 to guide it from the exit end of one rail segment to the entrance end of another, but other guidance systems would work equally well, and the use of a wire-based system should in no manner be read as a limitation to the possible methods of guiding the AGV.

Each of the rail segments includes at least one informational marker which can be read by a reading device onboard the AGV. In the preferred embodiment, the markers are bar codes and the reading devices is an optical scanner. Alternately, the markers could be magnets or small transponders for communicating with each AGV as it passes by the marker. Rail segment 10 includes a first marker 62 which is read by optical reader 64 onboard the AGV. This marker is located immediately downstream from the entrance end of guide rail 10 and it includes information identifying the particular rail segment that it is attached to. The AGV and/or a central controller for directing the AGV know where on the pathway a given AGV should be at a given time. If the information from the marker indicates that the vehicle is not on the correct rail segment, appropriate corrective action can be taken such as routing the vehicle back to its correct path or shutting down the system if necessary. Assuming that the AGV reads marker 62 and confirms that it is on the correct pathway, it will accelerate to a high speed such as 2200 feet per minute and travel along the rail. Guide rollers 56 straddle top strip 36 of the guide rail as AGV 40 traverses the rail and hold front wheels 42 parallel to the rail. If the pathway marked by the rail shifts slightly to the left or right for example, the guide rollers will cause steering arm 50 to follow the rail and turn wheels 42 in the correct direction to keep the AGV on the pathway. While the pathways marked by guide rails are generally linear, it is possible for them to deviate slightly to the left or the right or to describe very large radius turns, the radius depending on the speed of the vehicle. Generally, any such path segment may be treated as linear for purposes of discussion if it can be traversed safely by AGV 40 at full speed.

The AGV proceeds along rail 10 until it encounters another rail marker. This marker could be located toward the middle of the rail and provide a positional update for the AGV. By reading this marker, the AGV confirms that it is at a certain location at a certain time and this information can be passed along to the central controller. Eventually, the AGV will reach a terminal marker such as marker 66 on rail 10. This marker tells the AGV the distance to exit end 24 of the particular rail segment. If the AGV's instructions require it to execute a turn at the end of rail segment 10, it will begin a deceleration routine to reduce its speed to a safe speed for negotiating the turn. Once the AGV comes to exit end 24 of rail segment 10, it will be traveling at a low enough speed that it can be controlled safely by a non-rail guidance system such as one which includes an in-the-ground wire.

FIG. 1 shows several in-the-ground wires 68 marking out various paths for an AGV to follow from the exit end of rail segment 10. A first path a-b extends between rail segment 10 and rail segment 12; a second path a-c extends between rail segment 10 and rail segment 14; and a third path segment a-d extends between rail segment 10 and rail segment 14. If the pathway that AGV 40 has been instructed to follow requires it to travel from rail segment 10 to rail segment 14, it will follow pathway a-c through a 45 degree curve to the right and then through a 45 degree turn to the left until it is facing the entrance of segment 14. The pathway a-c is shaped such that the AGV approaches segment 14 with free end 55 of steering arm 50 generally aligned with rail 14 and pointing into flared guide 28. When free end 55 makes contact with guide 28, the guide centers steering arm 50 on rail 14 and helps ensure a proper engagement between the steering arm and rail 14 even if AGV 40 has deviated slightly from guide path a-c. Tapered end 22 of rail 14 also helps to correct for any minor deviations from the proper path by pushing free end 55 in one direction or the other to center the steering arm over the guide rail. Once the steering arm has engaged rail 14, AGV 40 proceeds along the rail until it comes to informational marker 70 which contains information identifying rail segment 14. AGV 40 then accelerates and proceeds along segment 14 until another junction or its final destination is reached, which information will be conveyed by additional markers on the rail. In order to proceed from rail 10 to rail 16, the AGV would proceed as above but along pathway a-d instead of pathway a-c The spacing between the exits and entrances of nearby rails is determined by the width and turning radius of the vehicles using the system. In order to provide for smooth transfer from one rail to another, the in-the-ground wires 68 are arranged so that straight path segments join radiused portions tangentially, and the spacing between the entrance and exits ends of the rail segments must be adequate to accommodate such pathways. In addition, because the rails are raised off ground 18, the spacing must be sufficient to allow a vehicle to make the required turns without its wheels passing over one or more of the rail sections. While the spacing can be made arbitrarily large, it is preferred to keep it to a minimum for purposes of efficiency because the AGV's can only travel at high speeds along the rail portions of the system.

If no turns are to be made at a given junction, such as when an AGV travels pathway a-b from rail 10 to rail 12, the AGV can be made to slow down as above and follow a linear guide wire. However, it is preferable to keep the vehicle operating at a high speed whenever possible. Therefore, in the preferred embodiment, when AGV 40 is to travel from rail 10 to rail 12, it will read the information from marker 66 and proceed straight ahead at its current speed. It will also lock steering arm 52 so that the AGV will continue to travel in a straight line once it passes exit end 24 of rail 10. Because the distance between exit end 24 of segment 10 and entrance end 22 of segment 12 is not great, on the order of twice the AGV's length for example, the vehicle will not veer off its course significantly over this distance and any minor deviation will be corrected by flared guide 28 and tapered portion 26 of rail 12 interacting with the steering arm. When first marker 72 on rail segment 12 is read to confirm that the AGV is on course, the steering mechanism is unlocked and the AGV proceeds to follow the rail segment as before.

The vehicle remains in communication with the central controller and/or is programmed to stop if it does not read the initial marker on rail 12 within a predetermined length of time. The vehicle can thus be rapidly stopped if it does not properly engage rail 14. If this occurs, however, it is likely that the left and right side tires of the vehicle would still be on opposite sides of rail 14 even if the steering arm had not properly engaged the rail. The tires on the vehicle could not easily roll across rail 10 and thus the deviation of the vehicle from its path would be minimal. In this manner, the vehicle is prevented from straying too far from its proper pathway and could safely be stopped once the problem was detected. Of course, in situations where it is absolutely critical to retain accurate control over the position of the vehicle at all times, such as when the AGV could cause significant damage if it missed its connection with rail 14, the vehicle should be slowed to a speed at which it can follow the in-the-ground wire which defines path a-b and travel from segment 10 to segment 14 by following this pathway.

Figure 5:
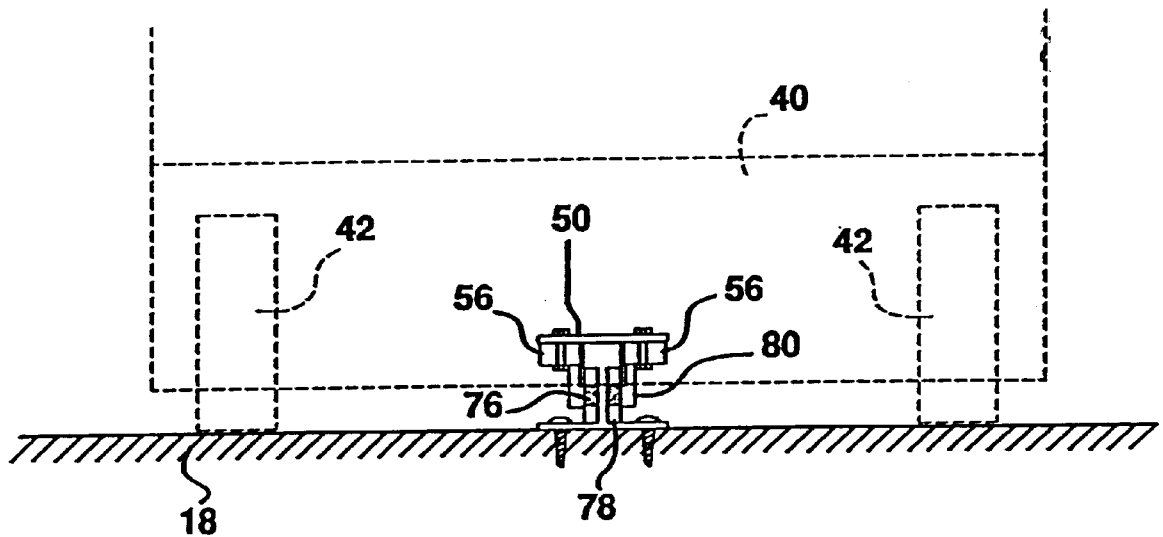
FIG. 5 is an elevational view of a second embodiment of the present invention wherein the rail of FIG. 2 is equipped with an electrical bus bar for providing power to the AGV.
Figure 6:
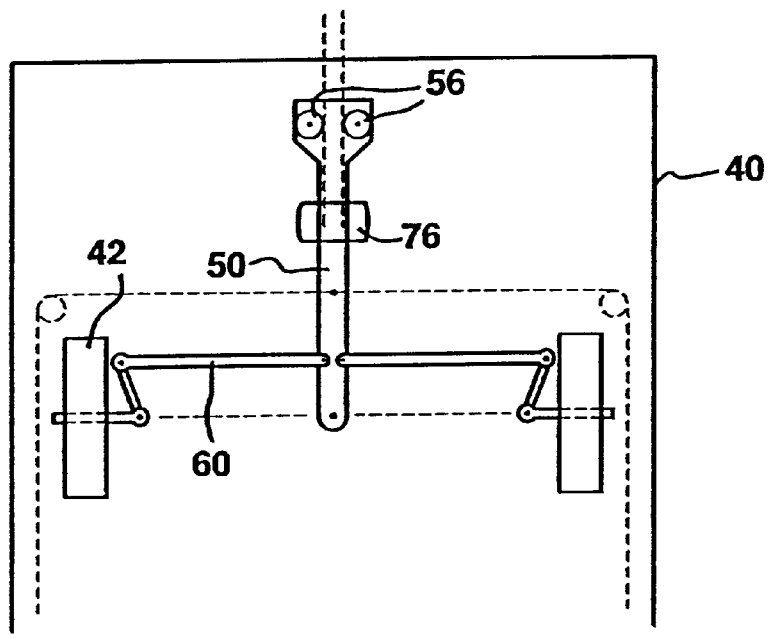
FIG. 6 is a plan view, partly in section, of the front portion of an AGV equipped with contacts for drawing power from the rail shown in FIG. 5.

FIGS. 5 and 6 show a second embodiment of the subject invention wherein the same reference numerals are used to identify parts common to the first embodiment. In this embodiment, the AGV receives power from a power bus bar 76 mounted in an insulator 78 that runs along the length of each rail segment. A pair of wiper arms 80 depend from steering arm 50 for drawing power from bus bar 76 in a well known manner. By delivering power to the AGV in this way, the need to carry a large battery onboard the AGV is eliminated. However, a small battery or capacitor (not shown) must be included to provide power for the AGV between rail segments. In addition, the problems associated with routing power bus bars through rail switches is also eliminated by eliminating the switches themselves from the system.

FIG. 7 shows a third embodiment of the invention in which the straight portions of the pathway are defined by a pair of spaced apart side rails 82. In this embodiment, a steering bar 84 extends perpendicularly from either side of steering arm 50 and guide rollers 56 depend from the opposite ends of the steering bar. The length of the steering bar 84 is slightly less than the spacing between rails 82 so that guide rollers 56 engage and roll along the side rails to hold AGV 40 to its path.

FIG. 8 shows a fourth embodiment of the subject invention which is identical to the third embodiment described above except that side rails 82 are provided with power bus bars 86 supported in insulators 88 running the length of each of the side rails. Wiper arms 90 depend from steering bar 84 to contact the bus bars and draw power therefrom in a well known manner.

While the subject invention has been described in terms of several preferred embodiments, it should be understood that various modifications and additions to these described embodiments may be made without exceeding the scope of this invention. For example, the particular rail guidance system can be varied as can the particular non-rail guidance system, as long as two such systems are used together in combination as disclosed and claimed. All such modifications and additions form part of the present invention to the extent that they are covered by the several claims appended hereto.

We claim:

1. A guidance system for guiding an AGV comprising:
   a plurality of noncontiguous rail segments;
   a steering mechanism for guiding the AGV along said rail segments; and,
   an electronic controller for guiding said AGV between said rail segments, the electronic controller directing the AGV from one rail segment to one of the other rail segments.

2. The guidance system of claim 1 wherein said electronic controller includes stored directions for guiding said AGV between rail segments.

3. The guidance system of claim 1 wherein said electronic controller receives directions for guiding said AGV between rail segments from a system controller.

4. The guidance system of claim 1 wherein said steering mechanism comprises guide roller means for engaging said plurality of rail segments.

5. The guidance system of claim 4 wherein said guide roller means comprises a pair of guide rollers having mutually parallel axes perpendicular to said steering mechanism.

6. The guidance system of claim 1, wherein at least one of the rail segments includes an entrance end having a flared guide.

7. The guidance system of claim 1, wherein at least one of the rail segments includes an entrance end and an exit end, the at least one rail segment further including a first informational marker immediately downstream from the entrance end, a second informational marker near the exit end, and a third informational marker between the first and second informational markers.

8. The guidance system of claim 7, wherein the first informational marker includes information identifying the at least one rail segment, the second informational marker includes information concerning the distance between the second informational marker and the exit end of the at least one rail segment, and the third informational marker including position update information.

9. The guidance system of claim 1 further including at least one pathway between two rail segments, wherein said electronic controller includes a microprocessor comprising a memory means for storing a description of the rail segments and the at least one pathway.

10. The guidance system of claim 9, wherein said information includes the lengths of the rail segments and the shape of the at least one pathway.

11. The guidance system of claim 1, wherein said electronic controller comprises an onboard controller and a central controller in communication with the onboard controller.

12. The guidance system of claim 1, wherein said steering mechanism includes a locking device to keep said AGV on a linear path between two rail segments.

13. A method for switching an automatic rail-guided vehicle from a first rail section to either a second rail section or a third rail section, the method comprising the steps of:
   providing an off-rail navigation system; and
   running said vehicle along said first rail section;
   navigating said vehicle from said first rail section to either said second rail section or said third rail section using said off-rail navigation system; and,
   running said vehicle along one of said second rail section or said third rail section.

14. The method of claim 13 including the additional steps of
   providing said first rail with a machine-readable informational marker;
   reading the information contained in said informational marker into said off-rail navigation system; and,
   navigating said vehicle in accordance with the information communicated by said marker.

15. The method of claim 13 wherein the step of running said vehicle along said first rail section includes the additional step of sensing the approach of an end of said first rail section.

16. The method of claim 15 comprising the steps of determining the path to be followed between the end of said first rail section and a beginning of one of said second rail section and third rail section, calculating a safe speed for traveling between said end and said beginning.

17. The method of claim 15 wherein the step of sensing the approach of the end of said first rail section comprises the step of determining whether said vehicle must execute a turn at said end.

18. The method of claim 17 wherein said vehicle includes steering means for following said rail sections and wherein said steering means locks to keep said vehicle on a linear path when said vehicle is not required to execute a turn at said end.

19. The method of claim 13 further comprising the step of providing at least one of the second and third rail segments with a flared guide at its entrance end.

20. The method of claim 13 further comprising the step of providing the first rail segment with a first informational marker immediately downstream from its entrance end, a second informational marker near its exit end, and a third informational marker between the first and second informational markers.

21. A guidance system for guiding an AGV comprising:

first, second and third separate rail segments for guiding the AGV; and, a controller for directing the AGV from the first rail segment to either one of the second and third rail segments.

22. The guidance system of claim 21, wherein the controller stores directions for AGV travel between the first rail segment and either one of the second and third rail segments.

23. The guidance system of claim 21 further including a steering mechanism for engaging the rail segments to guide the AGV.

24. The guidance system of claim 23, wherein the steering mechanism includes a steering arm having two ends, one of the ends of the steering arm being pivotably attached to the AGV.

25. The guidance system of claim 24, wherein the other end of the steering arm includes two rollers for engaging the rail segments.

26. The guidance system of claim 23, wherein said steering mechanism includes a locking device to keep said AGV on a linear path between two rail segments.

27. The guidance system of claim 21, wherein at least one of the second and third rail segments includes an entrance end having a flared guide.

28. The guidance system of claim 21, wherein the first rail segment includes an entrance end, an exit end, a first informational marker immediately downstream from the entrance end, a second informational marker near the exit end, and a third informational marker between the first and second informational markers.

29. The guidance system of claim 28, wherein the first informational marker includes information identifying the at least one rail segment, the second informational marker includes information concerning the distance between the second informational marker and the exit end of the at least one rail segment, and the third informational marker including position update information.

* * * * *